Nov. 26, 1963     A. F. MANZ ETAL     3,112,393
HELICAL WELDING CONTACTOR TUBE
Filed Sept. 13, 1961     3 Sheets-Sheet 2
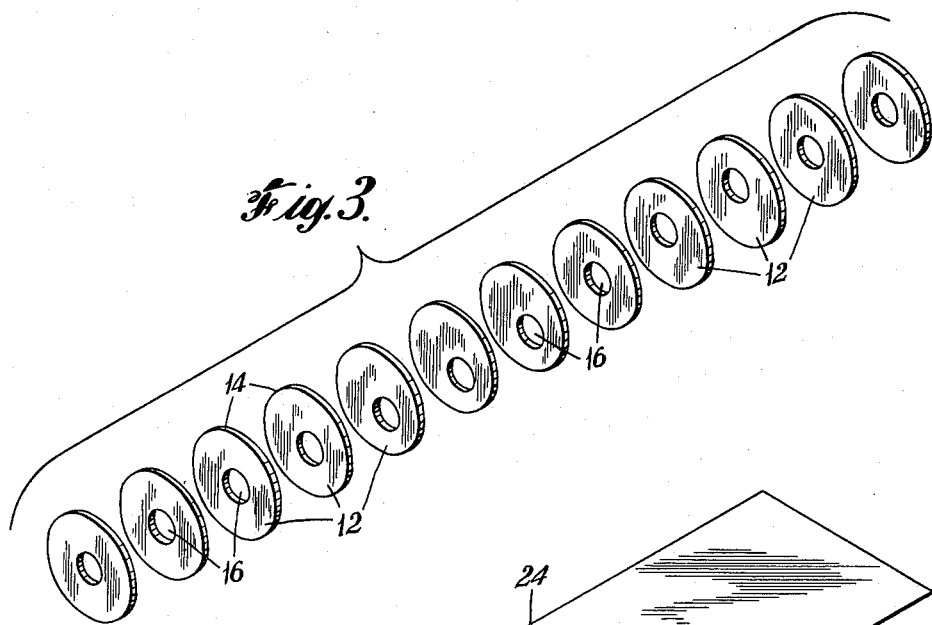
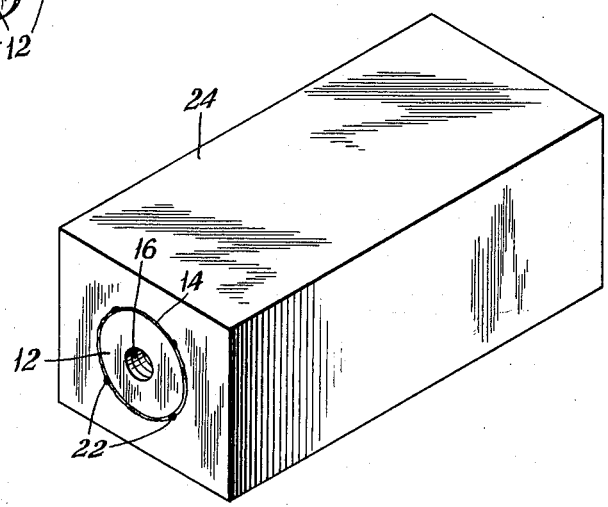
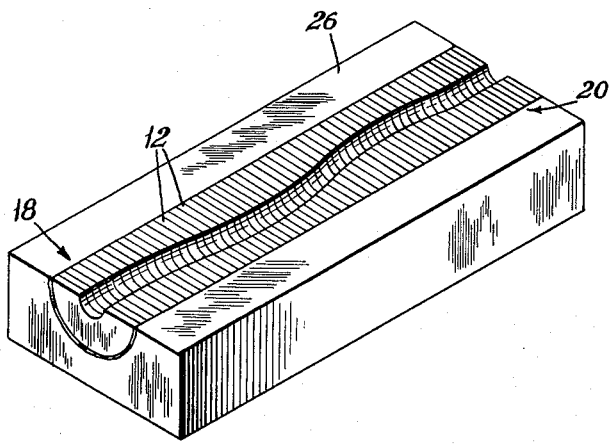
INVENTORS
AUGUST F. MANZ
FRANK J. PILIA
ATTORNEY Nov. 26, 1963     A. F. MANZ ETAL     3,112,393
HELICAL WELDING CONTACTOR TUBE
Filed Sept. 13, 1961     3 Sheets-Sheet 3
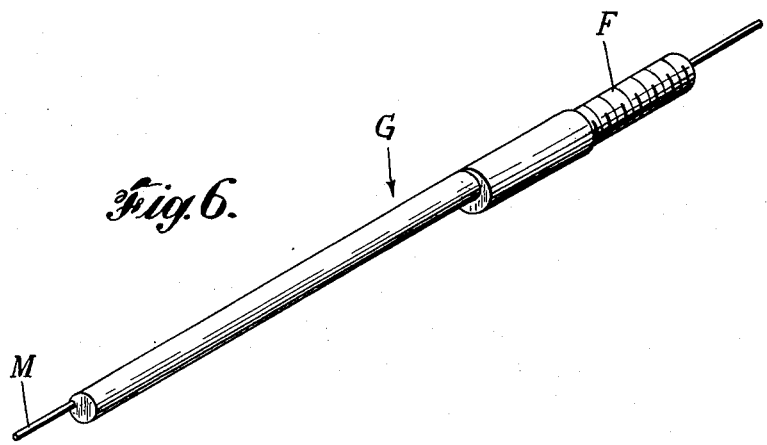
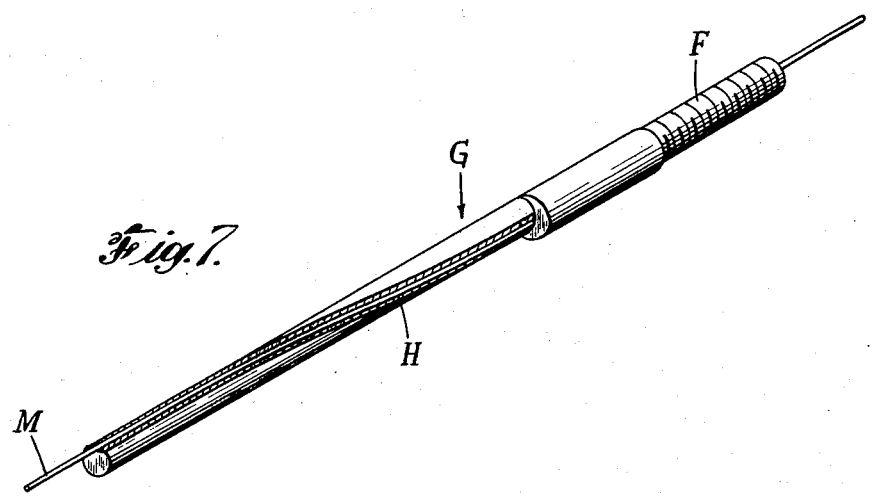
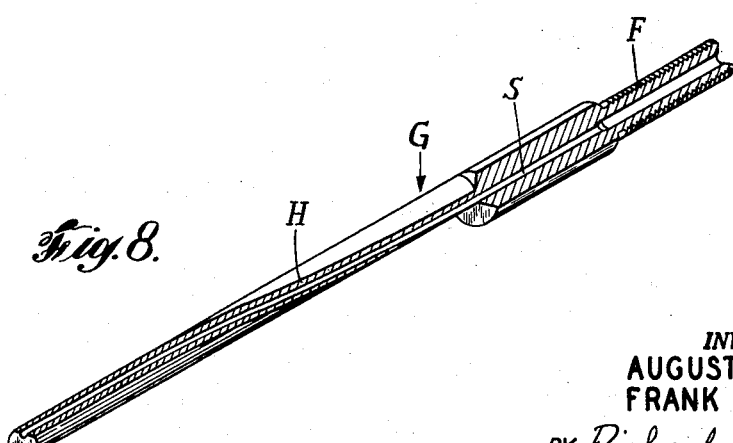
INVENTORS
AUGUST F. MANZ
FRANK J. PILIA
BY *Richard S. Shreve, Jr*
ATTORNEY 3,112,393
HELICAL WELDING CONTACTOR TUBE
August F. Manz, Newark, and Frank J. Pilia, West
Orange, N.J., assignors to Union Carbide Corporation,
a corporation of New York
Filed Sept. 13, 1961, Ser. No. 137,908
4 Claims. (Cl. 219—130)

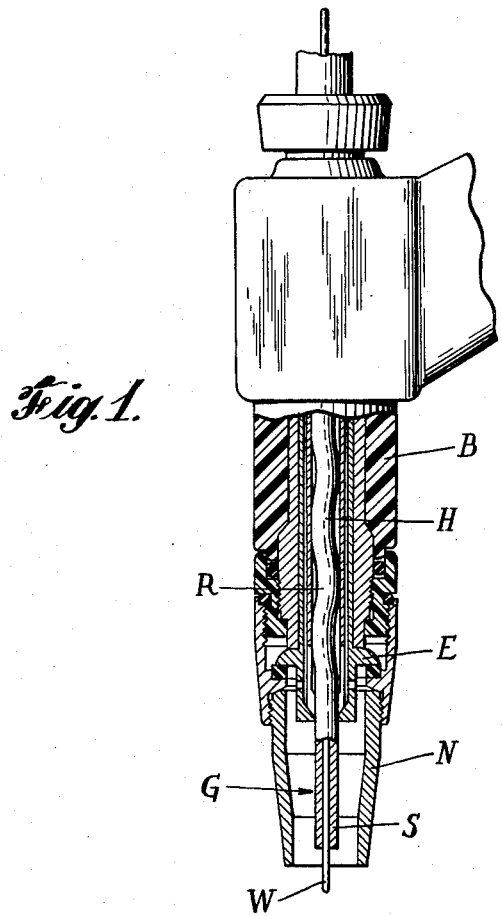
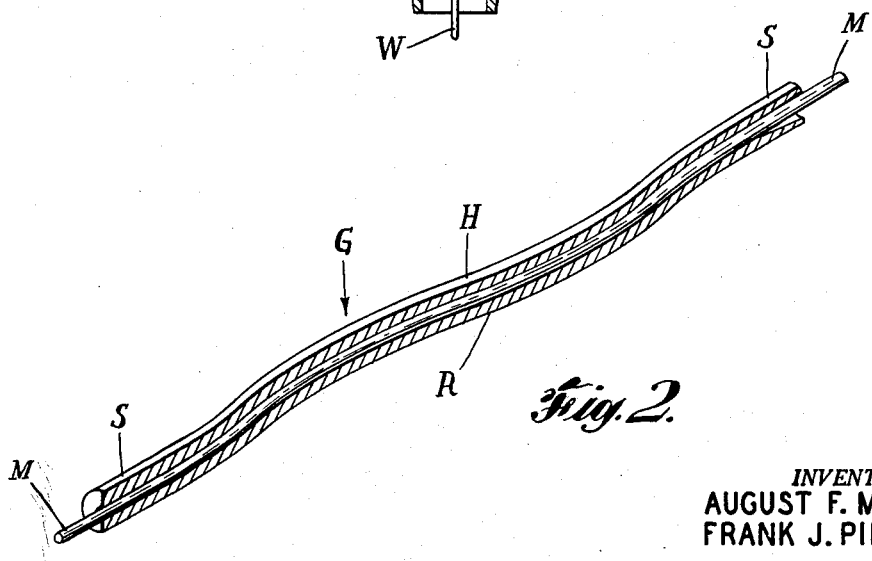

This invention relates to welding contactor tubes for use in gas shielded metal arc welding torches.

In such torches, the tendency of the wire to arc and fuse to the guide tube resulted in a short life for the tube.

It is therefore the main object of this invention to provide a helical guide tube with a select amount of eccentricity capable of minimizing the effects of $I^2R$ heating at the contact points and therein prevent the fusing of the electrode to the guide tube.

Other objects are to provide a maximum amount of clearance between the wire and contact tube for the reduction in the accumulation of dirt in such guide tube and still provide good electrical contact, to substantially increase the number of contact points between the electrode and the guide tube without reducing the clearance for dirt removal, and to provide a very economical and rapid method of manufacture of helical guide tubes.

According to this invention, the contactor tube has a helical passage therethrough with not more than three complete revolutions about the longitudinal axis thereof, preferably with a straight tube section in line with said axis, and preferably with an eccentricity of no greater than four wire diameters from said axis.

In the drawings:

FIG. 1 is an elevation, largely in axial section through an electric arc welding torch provided with a helical contactor tube according to the preferred embodiment of this invention;

FIG. 2 is a perspective section through the contact tube shown in FIG. 1;

FIG. 3 is an exploded perspective view showing the parts for the manufacture of a die for forming the contact tube of FIG. 2;

FIG. 4 is a perspective view of the parts of FIG. 3 assembled in a die block;

FIG. 5 is a perspective view of the bottom half of the split die;

FIG. 6 is a perspective view of a modified helical guide tube;

FIG. 7 is a similar view showing a part of said modified tube in section; and

FIG. 8 is a similar view, showing further parts thereof in section.

The metal arc torch shown in the drawing comprises a barrel B with an electrode holder E therein and a gas directing nozzle N therebelow. According to the present invention this torch is provide with a wire contactor guide tube G having a helical portion H inside the holder E and a straight portion S therebelow inside the nozzle N.

In the form shown in FIGS. 1 and 2, the wire contactor guide tube G has concentric inner and outer diameters, leaving a constant or uniform wall thickness. A portion of the longitudinal axis thereof is in the form of a long helix H having at least two complete revolutions R, with a straight portion S at at least one end thereof. The inner diameter forms a continuous longitudinal passage for the electrode wire W, and although slightly larger than the wire, nevertheless causes continuous electrical contact therewith throughout the length of the helix.

For the manufacture of this helical contact guide tube, as shown in FIG. 4, a series of eccentric holed washers 12 are assembled in relation to each other so that the outside forms a concentric diameter at 14 and the eccentric holes 16 (equal to the guide tube O.D.) develop a helix of the proper pitch and eccentricity which is controlled by the relationship of the washers to each other. Preferably, the washers are first assembled with the eccentric holes 16 in alignment on an axis parallel to the axis of the chamber 14, and thereafter intermediate washers are indexed or rotated a small angle to each other to form the helix.

Then the washers 12 and two cylindrical plugs or sections 18 and 20 of a diameter equal to the O.D. 14 of the washers and an I.D. 16 equal to the O.D. of the guide tube are assembled in a straight line. Four weld beads 22 are then made across the length of the cylinders and washers to bind the whole assembly together in the nature of a tube with the required geometry to the bore.

This assembly is then inserted into a die block 24, shown in FIG. 4. The parts are silver soldered together to form a solid die. The die block and the internal assembly is then split along the longitudinal axis of the bore to form the two halves of a die with a helical hole. The bottom half 26 is shown in FIG. 5. The bore is then blended with hand grinding to smooth out the steps that occur between washers in order to develop a smooth bore.

To use the die a straight copper guide tube of the correct O.D. and I.D. is placed between the halves of the die. A hard steel wire mandrel M is lubricated and inserted into the bore of the straight guide tube. The guide tube and die are then placed in a press and closed with a pressure ranging from 25,000 to 75,000 lbs., depending upon the size of the guide tube and the die configuration.

The straight guide tube is deformed beyond its elastic limit and as a result, assumes the geometry of the die. Since the bore is maintained uniform with respect to the O.D. of the tube, the bore also is formed to the helix as dictated by the bore of the die.

The hard steel wire mandrel M is removed by power after the guide tube has been formed and the helical guide tube is now ready for use. This method of manufacture of the die and of the guide tube has proven to be economical and positive in reproduction, thereby making the invention practical and economical to use.

An alternate method of manufacture is also provided in which a spiral hole may be made by swaging a guide tube with a straight hole. Thereafter, the outside of the guide tube is machined eccentrically to create an off-center hole, as shown in FIG. 3. Then by gripping and twisting the ends of the straight guide tube with an off-center hole, a spiral passage is manufactured as shown in FIG. 4.

The form shown in FIGS. 3, 4 and 5 is adapted for a torch having a screw socket to receive the feed in end F. A blank is swaged about a straight steel wire mandrel M to form a straight passage eccentric to the longitudinal axis of the blank. Then the blank is gripped and twisted at the ends to form straight tube with an off-center passage in helical form H as shown in FIGS. 4 and 5, extending from the straight portion through the center of the portion F.

In both forms, eccentricity of the central bore is generally held to less than four wire diameters and the number of revolutions of the spiral is held to less than three full turns, depending upon service requirements linear or non-linear spirals may be used. Generally, the wire should not be deformed beyond its elastic limit, except in creating a plastic deformation of the wire so that wire may be fed around corners.

It is to be noted that the welding wire proceeds through the guide tube in a preselected helical path. Such a path provides constant line-to-line contact between the wire W and the helical bore H. Experimentation has indicated that there exists a direct correlation between guide tube life and the internal bore configuration. Comparative studies of the inventive guide tube vs. conventional and bent guide tubes or cylindrical bore guide tube is tabulated in Table I. The inventive guide tube completed 4,200 spot welds before failure as compared with 2,687 for the bent guide tube and 500 for the straight guide tube.

Further utility of the invention was experienced in actual industrial tests. In a production setup, the inventive guide tube was compared with the conventional or straight bore guide tube. These tubes were used on a mechanized welding operation employing a 0.030 inch diameter aluminum wire after 4,000 welds were produced using each type of guide tube, only three failures in guide tubes occurred with the spiral or inventive guide tube as compared with eight failures of guide tubes of the conventional or straight bore (see Table II). By reducing the number of failures, the down time of manufacturing was reduced considerably and resulted in substantial savings.

*Table I*

| No. of Spot Welds Before Failure of the Guide Tube | Type of Guide Tube |
| --- | --- |
| 500 | Straight. |
| 2,687 | Bent. |
| 4,200 | Helical. |

*Table II*

| No. of Welds Manufactured | No. of Failures of Guide Tubes | Type of Guide Tube |
| --- | --- | --- |
| 4,000 | 8 | Straight. |
| 4,000 | 3 | Helical. |

What is claimed is:

1. For use in an electric welding torch to supply current to an electrode wire, a contactor guide tube having a continuous helical passage therethrough having not more than three complete revolutions about the longitudinal axis thereof.

2. A contactor guide tube as claimed in claim 1, in which said helical path extends into a straight tube section in line with said longitudinal axis.

3. A contactor guide tube as claimed in claim 2, in which said helical path has an eccentricity of no greater than four wire diameters from said longitudinal axis.

4. In a metal arc torch having a barrel with an electrode holder therein and a gas directing nozzle therebelow, an electrode wire guide tube having a portion inside said holder and a straight portion therebelow inside said nozzle, the improvement which comprises said portion of said electrode wire guide tube inside said holder being of helical configuration with a continuous helical passage therethrough having not more than three complete revolutions about the longitudinal axis thereof, and an eccentricity no greater than four wire diameters from said longitudinal axis.

References Cited in the file of this patent
UNITED STATES PATENTS

| | | |
| --- | --- | --- |
| 497,827 | Sellers | May 23, 1893 |
| 1,508,691 | Glasser | Sept. 16, 1924 |
| 2,332,360 | Wakefield | Oct. 19, 1943 |
| 2,679,172 | Clevenger et al. | May 25, 1954 |
| 2,693,638 | Anderson | Nov. 9, 1954 |
| 2,933,591 | Wojciak | Apr. 19, 1960 |